United States Patent [19]
Phillips

[11] Patent Number: 4,471,009
[45] Date of Patent: Sep. 11, 1984

[54] THERMOSETTING FILM-FORMING RECORDING LAYER COMPOSITION AND METHOD THEREFOR

[75] Inventor: Norman M. Phillips, San Jose, Calif.

[73] Assignee: Dysan Corporation, Santa Clara, Calif.

[21] Appl. No.: 485,522

[22] Filed: Apr. 15, 1983

[51] Int. Cl.$^3$ ............................................. A23F 3/00
[52] U.S. Cl. .................................. 427/386; 428/409; 428/463; 428/900; 524/303; 524/306; 524/311; 524/315; 524/430; 524/435; 524/440; 524/702; 524/773; 524/780; 524/785; 523/442; 523/448; 523/458; 523/459; 523/455
[58] Field of Search .............. 524/303, 306, 311, 315, 524/430, 435, 440, 702, 773, 780, 785; 523/442, 448, 458, 459, 455; 427/386; 428/409, 463, 900

[56] References Cited

U.S. PATENT DOCUMENTS

| | | | |
|---|---|---|---|
| 3,274,111 | 9/1966 | Sada et al. | 428/900 |
| 3,547,693 | 12/1970 | Huguenard | 428/900 |
| 3,630,772 | 12/1971 | Seidel et al. | 428/900 |
| 4,015,042 | 3/1977 | Chassaigne | 428/900 |
| 4,107,385 | 8/1978 | Higuchi et al. | 428/900 |
| 4,122,234 | 10/1978 | Lohoff | 428/900 |
| 4,172,176 | 10/1979 | Tanaka et al. | 428/900 |
| 4,289,828 | 9/1981 | Ota et al. | 428/900 |
| 4,291,100 | 9/1981 | Horigome et al. | 428/900 |
| 4,305,995 | 12/1981 | Ota et al. | 428/900 |
| 4,320,159 | 3/1982 | Ogawa et al. | 428/900 |

OTHER PUBLICATIONS

T. K. Miwa, "Chemical Aspects of Jojoba Oil a Unique Liquid Wax from Desert Shrub, Simmondsia Californica", *Cosmetic and Perfumery*, Jan. 1978.
T. K. Miwa et al., "Physical and Chemical Properties of Jojoba Liquid and Solid Waxes", *The Condensed Chemical Dictionary*, 10th edition, G. G. Hawley, ed.

*Primary Examiner*—Melvyn I. Marquis
*Attorney, Agent, or Firm*—Townsend and Townsend

[57] ABSTRACT

A thermosetting composition for use in the formation of a magnetizable film on a substrate is disclosed herein, which has improved resistance to frictional wear and abrasion, and improved impact durability. The composition comprises a heat-curable polymer resin, magnetizable particles, a fatty ester, and sufficient solvent to provide a viscosity of from about 200 to about 600 centipoise at about 24° C. The method of preparation of the composition as well as its use are also disclosed.

13 Claims, No Drawings

THERMOSETTING FILM-FORMING RECORDING LAYER COMPOSITION AND METHOD THEREFOR

BACKGROUND OF THE INVENTION

1. Field of the Invention

This invention relates to heat-hardenable liquid film-forming compositions having fine particulate matter dispersed therein. In particular, this invention relates to those of such compositions which are used for coating substrates with a magnetizable layer to prepare memory devices such as, for example, magnetic memory discs (both hard and flexible), magnetic tape, and the like.

2. Description of the Prior Art

A variety of magnetic coating compositions are known to be useful in the fabrication of magnetic memory elements. Examples are those disclosed in Alles et al., U.S. Pat. No. 3,009,847 (Nov. 21, 1961); Higashi et al., U.S. Pat. No. 3,474,073 (Oct. 21, 1969); Akashi et al., U.S. Pat. No. 3,689,317 (Sept. 5, 1982); Brilovich et al., U.S. Pat. No. 4,049,566 (Sept. 20, 1977); Lohoff, U.S. Pat. No. 4,122,234 (Oct. 24, 1978); and Ogawa, et al., U.S. Pat. No. 4,320,159 (Mar. 16, 1982).

These and similar compositions generally comprise fine particles of a magnetizable solid, such as iron oxide, dispersed in a solvent-polymer solution. To prepare the memory element, a thin film of the dispersion is applied to a substrate material, which may either be rigid, such as aluminum, or flexible, such as a polyester film (MYLAR film, for example). Typical methods of application include dip coating, spray coating, reverse roll coating, transfer roll coating, and spin coating. The coated substrate is then heated to evaporate the solvent and to cure the polymer, leaving a hardened film with the magnetizable particles embedded therein.

Some of these compositions have a relatively soft surface hardness upon curing. As a result, elements made with such compositions, when employed in tape recorder applications, are highly susceptible to frictional wear resulting from direct contact with the recording and reproducing heads. This shortens the useful life of such tapes.

A similar problem arises in elements used in rotating disc file memories. These discs are typically rotated at extremely high speeds, while separated only by a thin cushion of air from one or more aerodynamically supported read/write transducer heads. Despite the flotation effect, intermittent contact normally occurs between the surfaces of the transducer heads and the surface of the rotating disc. The abrasion resulting from this contact can sharply reduce the useful life of the disc.

In high-speed applications in general, including both linear tape drives and rotating disc memories, the acceleration forces experienced by the magnetizable particles embedded in the film layer when certain compositions are used are often high enough to cause ejection of the particles from the layer. In addition to weakening the magnetic susceptibility of the layer, this particle migration causes an accumulation of the particles on the surface of the associated transducer. The result is an impairment of the aerodynamic characteristics of the transducer and its associated support, and the "crashing" of the head into the magnetic recording surface, destroying the utility of the entire memory element.

SUMMARY OF THE INVENTION

A thermosetting composition for use in the formation of a magnetizable film is provided herein, which overcomes the disadvantages enumerated above. In particular, it has now been discovered that a magnetizable film layer having improved resistance to abrasion, frictional wear, impact, and the high temperature effects of friction is obtained by the inclusion of a fatty ester in the film-forming composition.

The present invention resides in the film-forming composition, its method of preparation, and its method of use in forming a cured magnetizable polymer film over a substrate.

DESCRIPTION OF THE PREFERRED EMBODIMENTS

According to the present invention, improved performance is imparted to magnetizable films by the inclusion of a fatty ester in the film-forming composition. For a more complete understanding of the invention, each of the system compounds in its various embodiments will be described.

The fatty ester can vary considerably in terms of its structure and molecular weight. As used here, the term "fatty ester" encompasses esters of long chain carboxylic acids in general, including both straight and branched chains, both saturated and unsaturated species, and synthetic species as well as those derived from natural sources. Preferred esters are those containing a total of about 20 to about 80 carbon atoms. More preferred are those having from about 30 to about 60 carbon atoms, and which are of a primarily straight-chain configuration with at least one unsaturated bond. The term is further contemplated to include mixtures of such materials. The most preferred such esters are naturally occurring wax esters. A particularly useful example is jojoba oil, a naturally occurring oil, whose major components are $C_{20}$ and $C_{22}$ straight chain monoethylene acids and alcohols in the form of esters.

The quantity of esters used in the composition of the present invention is not critical and can vary over a wide range. The term "effective amount" is used herein to designate any amount which will impart to the magnetizable coating the improved properties described herein, without adversely affecting the smoothness and uniformity of the coating surface. The range of proportions which fit this description will vary with the coating composition used as well as the ester itself. For most applications, an amount ranging from about 1% to about 10% by weight, based on total dissolved solids, will provide the best results. Particularly preferred amounts are those within the range of about 2% to about 8% by weight. The term "total dissolved solids" is used herein to designate all components except solvents.

The identity of the film-forming composition is similarly noncritical. In general, any resin capable of curing upon exposure to heat may be used. This includes conventional resins used in the manufacture of magnetic recording elements. Resins typically used are organic polymeric materials capable of cross-linking in the presence of a polymerization catalyst. Preferred resins are those which do not soften or melt before thermal decomposition occurs. Examples are epoxy resins, epoxy NOVOLAC resins, phenoxy resins, phenoxy NOVOLAC resins, polyurethane resins, and the like. A more extensive list is found in Ogawa et al., U.S. Pat. No.

4,320,159 (Mar. 16, 1982), incorporated herein by reference.

Particularly preferred resins are epoxy-based resins, common examples of which are those obtained by reacting epichlorohydrin with polyhydric phenols. Such resins are particularly useful when used with known additives such as, for example, NOVOLAC resins, celluloses, and polyisocyanates. Disclosures of some of these combinations are provided in the patents listed above in the section titled "Description of the Prior Art."

Many such epoxy resins are commercially available, notably the Araldite series available from Ciga-Geigy Corporation (Greensboro, N.C.), the EER series available from Union Carbide Corporation (Danbury, Conn.), the DER series available from Dow Chemical Co. (Midland, Mich.), the Epotuf series available from Reichhold Chemical, Incorporated (Pensacola, Fla.), and the Epon series available from Shell Chemical Company (Houston, Tex.). Preferred epoxy resins are those having from one to about six epoxy groups per polymer unit, and epoxy equivalent weights varying in the range of from about 165 to about 6,000, preferably from about 250 to about 1000. Particularly useful resins are those of the Epon series of Shell Chemical Company having a range of numerical designations extending from Epon 828 to Epon 1010. A typical example is the resin Epon 1001, having an epoxy equivalent weight of from about 450 to about 550, and a melting point of from about 65° C. to about 70° C. The amount used may vary widely, but generally falls within the range of about 10 weight percent to about 50 weight percent, preferably from about 20 weight percent to about 40 weight percent, based on total dissolved solids.

Particularly preferred film-forming compositions are those comprising epoxy resins in combinations with cellulose acetate butyrate resins, such as those disclosed in Lohoff, U.S. Pat. No. 4,122,234, incorporated herein by reference. The cellulose acetate butyrate (hereinafter referred to as "CAB") may vary considerably in molecular structure. In most applications, those such resins which have a butyryl content of about 17 weight percent or above will provide the best results. Particularly useful CAB resins are those manufactured by the reaction of purified cellulose with acetic and butyric anhydrides in glacial acetic acid catalyzed by sulfuric acid. Such materials are obtainable from Eastman Chemical Products, Inc. (Kingsport, Tenn.) under the trade name Eastman CAB. Preferred polymers in this series are CAB-171-15 and CAB-272-20, due to their ability to form particularly hard, tough and solvent resistant films. The amount used may vary widely, but generally falls within the range of about 1 weight percent to about 20 weight percent, preferably from about 2 weight percent to about 12 weight percent, based on total dissolved solids.

The magnetization capability of the composition is derived from the inclusion of fine particulate material dispersed throughout the coating composition. The particulate material may be comprised of any of the known types of magnetizable substances, such as, for example, iron oxide, chromium dioxide, doped oxides, alloy particles and the like. Examples include $\gamma\text{-}Fe_2O_3$, $Fe_3O_4$, Co-containing $\gamma\text{-}Fe_2O_3$, Co-containing $Fe_3O_4$, $CrO_2$, $Zn_xFe_{1-x}Fe_2O_4$, Fe—Co—Ni alloy, Fe—Co—Cu alloy, and Co—Ni alloy in powdered form. In general, a particle size of less than about 2 microns in length will provide the best results, with preferred particles being those of about 0.1 micron to about 1.0 micron in length, with a length to width ratio of about 4:1 to about 15:1, and a coercive force $H_c$ of about 250 to about 1000 oersteds. The quantity of such particles in the coating composition is not critical, although best results are generally obtained when such particles comprise from about 40% to about 85% by weight of the total dissolved solids, preferably from about 50% to about 75%.

Because of the need for extremely thin films, any of various types of volatile solvents are usually added to the composition to produce a viscosity within a specific range. In most applications, the desired viscosity range is from about 200 to about 600 centipoise, preferably from about 300 to about 350 centipoise, as measured at 24° C. by a Brookfield viscometer No. 2 spindle at 20 rpm. Examples of such solvents are:

esters: ethyl acetate, butyl acetate, Cellosolve acetate
ketones: acetone, methyl ethyl ketone, isophorone, cyclohexanone, diacetone alcohol
ethers and glycol ethers: Cellosolve, diethylene glycol methyl ether, bis-(2-methoxyethyl) ether, diethylene glycol n-butyl ether, butyl Carbitol ®, butyl Cellosolve.

The amount of solvent is not critical and can vary over a wide range. In common usage, about 100 to about 700 parts by weight of solvent will be used per 100 parts by weight of the remainder of the coating composition. The solvents listed above may be used either individually or in combination.

Depending on the particular resin used and the type of polymerization reaction, it is frequently desirable to include a catalyst in the formulation. In general, catalysts known to be effective for the various polymerization reactions cited herein can be used. In epoxy resins, useful catalysts include primary amines and hydroxyl compounds. The preferred primary amines are polyamines having at least one primary amine group per molecule. Examples include: N-aminoethylpiperazine, N-(trimethoxysilylpropyl)ethylenediamine, diethylenetetramine, and ethylenediamine. N-aminoethylpiperazine is particularly preferred. Suitable hydroxyl catalysts include monoalcohols (e.g., n-butyl alcohol), diols (e.g., propylene glycol), triols (e.g., 1,2,3-trihydroxypropane) chlorohydrins, organic acids (e.g., acetic acid, formic acid) and phenols. Of the hydroxyl compounds, formic acid is particularly preferred. Exemplary catalysts for use with novolak epoxy resins include methylene dianiline and diamino diphenyl sulfone. Exemplary catalysts for use with polyurethanes include diiso- and triisocyanates.

The amount of catalyst included may vary widely, and will differ depending on the type of resin and the type of catalyst. When using amine catalysts, a convenient ratio of epoxide equivalents to amine equivalents will generally lie within the range of about 1:4 to about 4:1. A preferred concentration is from about 5% to about 15% by weight, based on the epoxy solids. With hydroxyl catalysts, a convenient operating range is about 5% to about 40% by weight, based on epoxy solids, with a preferred concentration of about 15% to about 25% by weight.

In the preferred practice on the invention, the coating composition further includes fine particles of alumina dispersed therethrough, to enhance the durability of the coating and to provide it with a small degree of abrasiveness effective in maintaining the recording and reproducing heads free of debris. Effective results can be obtained with average particle sizes ranging from about 0.1 micron to about 3.0 microns. The amount used is not critical and will generally vary from about 0.5% to about 7.5% by weight of the total dissolved solids.

Depending upon the particular components used in the composition, it will be understood by those skilled in the art that further additives may be included to impart or enhance particular properties. For example, lubricants such as castor oil can be included to enhance the load capacity of the elements; nonionic surfactants can be included to increase the dispersability of the magnetizable particles, and materials such as carbon black can be included to control the conductivity. Further examples of such additives, as well as film-forming compositions, catalysts, solvents, and magnetizable particles are found in Ogawa et al., supra.

The components of the composition of the present invention can be combined in any manner or in any order which will produce a substantially uniform dispersion having a viscosity in the appropriate range. In general, best results are obtained by mixing the polymer resins in solid particles in the solvent, then milling the resulting mixture to remove any agglomerates, then adding the fatty ester and finally adding additional solvent as needed to adjust the viscosity to the desired level. When a polymerization catalyst is used, it is most conveniently added together with or subsequent to the fatty ester.

The composition can then be applied to any of the substrates conventionally used for magnetic recording elements with excellent results. The latter includes both rigid substrates such as, for example, aluminum discs, and flexible substrates such as, for example, polyester films in the shape of discs or tapes. Application is achieved according to methods known to those skilled in the art. Application to an aluminum disc, for example, is commonly achieved by spin coating, followed by a magnetic field orientation technique to align the particles in the circumferential direction on the disc surface. Such techniques use either alternating or direct current with a field strength ranging from about 100 to about 2,000 gauss. Other means of application include spray coating, knife coating, reverse roll coating, transfer roll coating, and the like. Once the particles are aligned, the disc is cured at an elevated temperature. For epoxy resins, curing typically occurs at a temperature of from about 210° C. to about 240° C. for about 2 to about 4 hours. The temperature and time for curing when other materials are used will vary widely, depending upon the chemical nature of the resins and solvents used, as necessary to evaporate the solvents and permit sufficient cross-linkage to occur in the polymer network. Once curing has occurred, the magnetic layer may be smoothed by polishing, calendering, or both, to achieve the desired smoothness. The result is a magnetic layer which is highly resistant to impact damage, abrasion, and high heats of friction.

The following examples are offered for illustrative purposes only, and are intended neither to limit nor define the invention in any manner.

EXAMPLES

The following compositions were prepared as follows:

To a mixture of the magnetic iron oxide, alumina, and cyclohexanone was added about two-thirds of the epoxy resin solution and about one-third of the CAB solution. The resulting mixture was stirred until thoroughly mixed, then milled until free of agglomerates. The remaining portions of both solutions were then added, and thoroughly mixed in. Finally, the N-aminoethylpiperazine, jojoba oil and bis-(2-methoxyethyl) ether were added. The final viscosity in each case was approximately 320 centipoise at 24° C., as measured on a Brookfield viscometer with No. 2 spindle at 20 revolutions per minute.

The compositions were substantially identical, except for the amount of jojoba oil, which ranged from zero up to twenty percent by weight of the solids (i.e., all components other than solvents). The compositions containing 2.0% and 4.0% jojoba oil are given in Table I.

TABLE I

| COMPONENTS OF COATING COMPOSITIONS | | |
|---|---|---|
| Component | Parts By Weight | Weight % Solids |
| A. 2% Composition | | |
| Magnetic iron oxide | 56.3 | 56.3 |
| Epoxy resin (60% in Cellosolve) | 48.7 | 29.2 |
| CAB (6.2% in cyclohexanone) | 136.2 | 8.4 |
| Cyclohexanone | 30.5 | — |
| N—Aminoethylpiperazine | 3.1 | 3.1 |
| Bis-(2-methoxyethyl) ether | 138.0 | — |
| Jojoba oil | 2.0 | 2.0 |
| Alumina | 1.0 | 1.0 |
| TOTAL | 415.8 | 100.0 |
| B. 4% Composition | | |
| Magnetic iron oxide | 56.3 | 56.3 |
| Epoxy resin (60% in Cellosolve) | 46.3 | 27.8 |
| CAB (6.2% in cyclohexanone) | 129.0 | 8.0 |
| Cyclohexanone | 38.3 | — |
| N—Aminoethylpiperazine | 2.9 | 2.9 |
| Bis-(2-methoxyethyl) ether | 138.0 | — |
| Jojoba oil | 4.0 | 4.0 |
| Alumina | 1.0 | 1.0 |
| TOTAL | 415.8 | 100.0 |

The materials used had the following particulars:

Magnetic iron oxide: trade designation, MO2228; supplier, Charles Pfizer and Co., Inc., New York, N.Y.; coercive force $H_c$=315–335 oersteds; minimum specific magnetic movement 78 emu/g.

Epoxy resin: trade designation, EPON 1001F; epoxide equivalent weight=450–550; melting point=65°–75° C.; supplier, Shell Chemical Company, Houston, Tex.

CAB: (cellulose acetate butyrate) trade designation, CAB 272-20; butyryl content (average)=26%, acetal content (average)=20.5%, hydroxyl content (average)=2.5%, viscosity=15–35 seconds, melting point=156° C.; supplier, Eastman Chemical Products, Inc., Kingsport, Tenn.

Jojoba oil: average molecular weight=600–610; major component, erucyl 11-cis-eicosenoate; supplier, Jojoba Service International, Los Gatos, Calif.

Alumina: Norton Co., Newton, Mass.

The compositions were applied to aluminum discs by a conventional spin coating technique, then oriented and cured at 210° C. to 240° C. for approximately three hours. The cured surfaces were then cooled and polished to a 1.0 microinch (center line average) finish. Each of the following physical tests were then performed on each disc.

A. Headload. The disc is used to mechanically load and unload a disc drive read/write head 50,000 times at a rate of 200 loads per minute, each load comprising 360±10 grams. The surface of the coating is examined for damage and the head for cleanliness.

B. Headcrash Resistance and Recovery. A standard read/write head is forced against the surface of a spinning disc by a pneumatic cylinder. The pressure is increased until a noticeable mark appears on the coating. The final pressure is recorded, and the surfaces of both head and disc are examined, the head for deposited coating and the disc for damage.

C. Gardner Impact. The coating adhesion is tested with a heavy duty Gardner Laboratory, Inc., Impact Tester.

D. Static Friction. A standard read/write head, weighted with a ten-gram load, is placed on the coating surface, and the force required to initiate movement of the head across the surface is measured.

E. Solvent Resistant. Methyl ethyl ketone is placed on the coating surface and the surface is rubbed with a cotton swab saturated with the same solvent.

In each case, the test results were rated by comparison against a set of standards. Standard certification tests for magnetic discs were also performed, using conventional error detection equipment.

For each test, the following rating scale was used:

| Index | Rating |
|---|---|
| 1 | excellent |
| 2 | very good |
| 3 | good |
| 4 | fair |
| 5 | poor |

The results are listed in Table II below, where improved resistance to headload and headcrash damage (Physical Tests A and B) are evident at jojoba oil concentrations of 4% to 8%.

TABLE II

TEST RESULTS AT VARYING CONCENTRATIONS OF JOJOBA OIL

| JOJOBA OIL CONCENTRATION (WEIGHT %) | CERTIFICATION TEST RESULTS | PHYSICAL TESTS | | | | | COATING SURFACE APPEARANCE |
|---|---|---|---|---|---|---|---|
| | | A | B | C | D | E | |
| 0 | 2 | 3 | 3 | 3 | 3 | 3 | Smooth |
| 2 | 3 | 3 | 3 | 3 | 3 | 3 | Smooth |
| 4 | 3 | 2 | 2 | 3 | 3 | 3 | Smooth |
| 6 | 3 | 2 | 2 | 3 | 4 | 3 | Smooth |
| 8 | 4 | 2 | 2 | 3 | 3 | 3 | Slightly mottled |
| 10 | 5 | 4 | 4 | 4 | 3 | 3 | Heavily mottled |
| 15 | — | — | — | — | — | — | Extremely mottled |
| 20 | — | — | — | — | — | — | Extremely mottled |

While the foregoing description provides extensive details in connection with various preferred embodiments of the invention, the description is intended for illustrative purposes only. Various modifications, variations, alternate constructions and equivalents will be readily apparent to those skilled in the art, and may thus be employed without departing from the true spirit and scope of the invention. The description and illustrations offered above should thus not be construed as limiting the scope of the invention, which is defined instead by the claims appended hereto.

What is claimed is:

1. A heat-hardenable liquid magnetizable film-forming composition for use in the preparation of rigid magnetic memory discs, comprising:
   a heat-curable epoxy polymer resin;
   magnetizable particles of less than about 2.0 microns in length substantially uniformly dispersed throughout said resin in an amount sufficient to impart magnetization capability thereto;
   about 1% to about 10% by weight of jojoba oil; and
   sufficient solvent to impart to said composition a viscosity of from about 200 to about 600 centipoise at about 24° C.

2. A composition according to claim 1 in which said jojoba oil comprises from about 2% to about 8% by weight, based on total dissolved solids.

3. A composition according to claim 1 further comprising a catalytically effective amount of a polymerization catalyst.

4. A composition according to claim 1 in which said epoxy resin has an epoxide equivalent weight of from about 165 to about 6000 and is combined with a cellulose acetate butyrate with a butyryl content of at least about 17%.

5. A composition according to claim 4 further comprising an effective amount of a catalyst selected from polyamine compounds having at least one primary amine per molecule and hydroxyl compounds.

6. A composition according to claim 1 further comprising from about 0.5% to about 7.5% by weight of substantially uniformly dispersed alumina particles.

7. A heat-hardenable liquid magnetizable film-forming composition for use in the preparation of rigid magnetic memory discs, comprising:
   a heat-curable polymer resin comprising about 10% to about 50% of an epoxy resin with an epoxide equivalent weight of from about 165 to about 6000 and about 1% to about 20% of a cellulose acetate butyrate with a butyryl content of at least about 17%;
   a polyamine polymerization catalyst having at least one primary amine per molecule, at a concentration such that the ratio of epoxide equivalents to amine equivalents is from about 1:4 to about 4:1;
   about 40% to about 85% of substantially uniformly dispersed magnetizable particles less than about 2.0 microns in length;
   about 1% to about 10% of jojoba oil;
   about 0.5% to about 7.5% of substantially uniformly dispersed alumina particles; and
   sufficient solvent to impart to said composition a viscosity of from about 200 to about 600 centipoise at about 24° C.;
   all said component percents being on a weight basis, based upon total dissolved solids.

8. A heat-hardenable liquid magnetizable film-forming composition for use in the preparation of rigid magnetic memory discs, comprising:

a heat-curable polymer resin comprising about 20% to about 40% of an epoxy resin with an epoxide equivalent weight of from about 250 to about 1000 and about 2% to about 12% of a cellulose acetate butyrate with a butyryl content of at least about 17%;

about 2% to about 5% of N-aminoethylpiperazine;

about 50% to about 75% of substantially uniformly dispersed magnetizable particles less than about 2.0 microns in length;

about 2% to about 8% jojoba oil;

about 0.5% to about 7.5% of substantially uniformly dispersed alumina particles; and sufficient solvent to impart to said composition a viscosity of from about 200 to about 600 centipoise at about 24° C., all said component percents being on a weight basis, based upon total dissolved solids.

9. A process for the preparation of a heat-hardenable liquid magnetizable film-forming composition for use in the preparation of rigid magnetic memory discs, said process comprising the steps of:

(a) combining magnetizable particles of less than about 2.0 microns in length with an organic solution of a heat-curable epoxy polymer resin to form a substantially uniform dispersion in an amount sufficient to impart magnetization capability thereto upon curing;

(b) combining said dispersion with about 1% to about 10% by weight jojoba oil; and (c) combining the product of step (b) with a catalytically effective amount of a polymerization catalyst.

10. A process according to claim 9 which further comprises combining of alumina particles with the components of step (a) to comprise from about 0.5% to about 7.5% by weight of said dispersion.

11. A process according to claim 9 in which sufficient organic solvent is included to provide a viscosity of from about 200 to about 600 centipoise at about 24° C.

12. A process according to claim 9 in which said polymer resin is a mixture of an epoxy resin with an epoxide equivalent weight of from about 165 to about 6000 and a cellulose acetate butyrate with a butyryl content of at least about 17%, said polymerization catalyst is N-aminoethylpiperazine, said composition further comprises from about 0.5% to about 7.5% by weight of alumina particles, and the viscosity of said composition is from about 200 to about 600 centipoise at about 24° C.

13. A process for forming a solid adherent magnetizable film on a rigid substrate, said process comprising applying to said substrate a composition according to claim 1 to form a thin film thereof of uniform thickness, and curing said film at elevated temperature to evaporate therefrom substantially all solvent and to form a solid adherent layer.

* * * * *